United States Patent [19]

Brown

[11] Patent Number: 4,793,658
[45] Date of Patent: Dec. 27, 1988

[54] VEHICLE WHEEL COVER

[75] Inventor: Trevor J. Brown, Rochester, Mich.

[73] Assignee: General Motor Corporation, Detroit, Mich.

[21] Appl. No.: 91,098

[22] Filed: Mar. 31, 1987

[51] Int. Cl.[4] .............................................. B60B 7/00
[52] U.S. Cl. .............................. 301/37 PB; 301/37 R; 301/37 P; 301/108 R
[58] Field of Search ................ 30/37 PB, 37 R, 37 P, 30/37 C, 37 TP, 108 R, 108 A

[56] References Cited

U.S. PATENT DOCUMENTS 2,898,152 8/1959 Lyon ............................... 301/37 PB
4,357,053 11/1982 Spisak ............................... 301/37 P Primary Examiner—James B. Marbert
Attorney, Agent, or Firm—Herbert Furman

[57] ABSTRACT

A vehicle wheel cover includes a cover body having apertured flange portions arranged in diametrically opposite pairs. A leaf spring extends between each pair of apertured flange portions and includes shoulder means projecting radially outwardly of the flange portions for cooperative engagement with abutment means of a wheel opening. The leaf springs are in overcenter relationship to the cover body to provide a spring force resisting radial inward movement of the shoulder portions thereof.

8 Claims, 1 Drawing Sheet

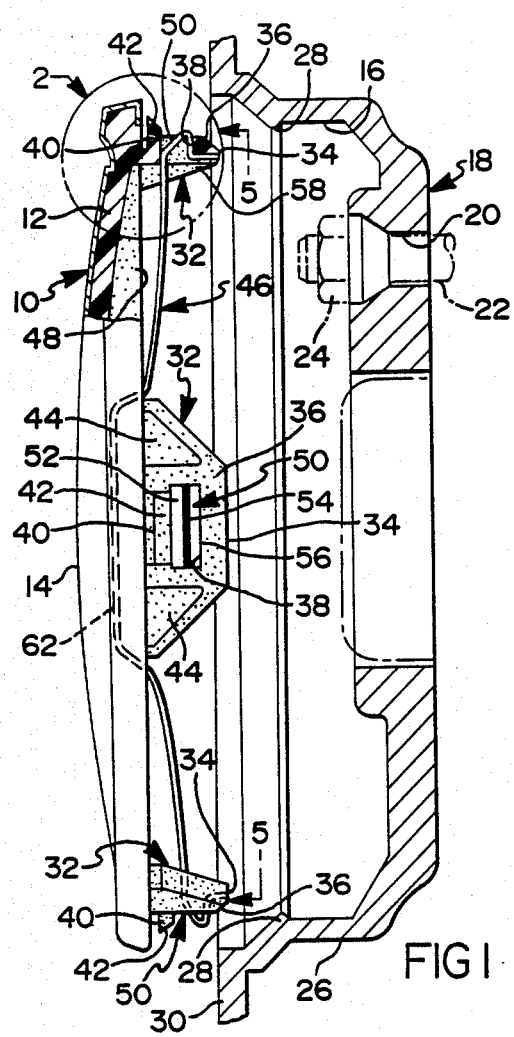
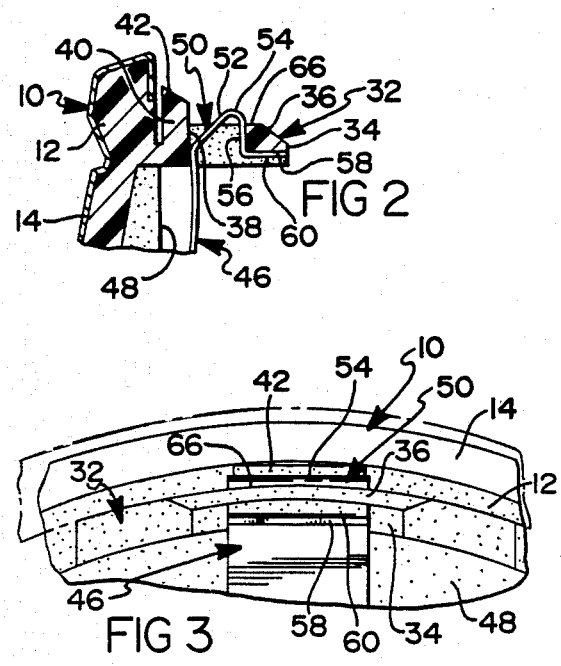
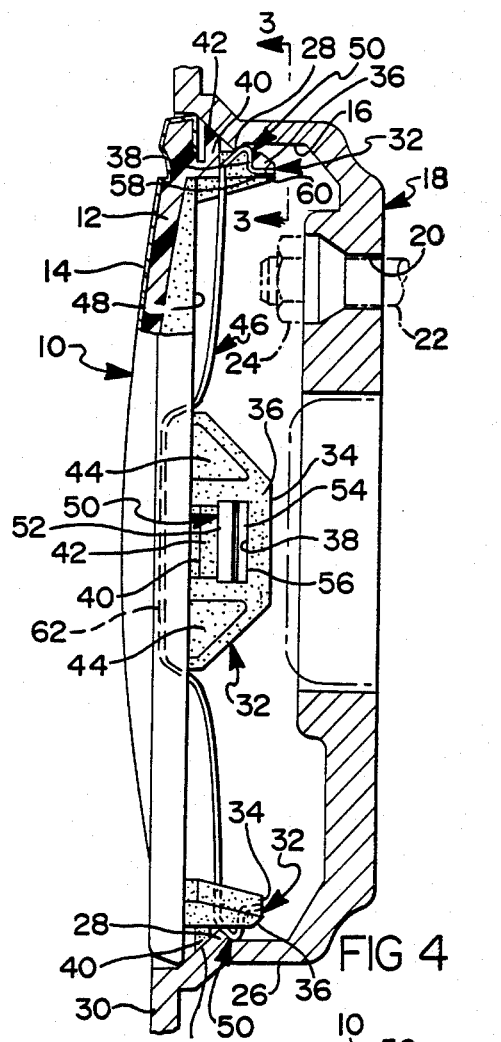
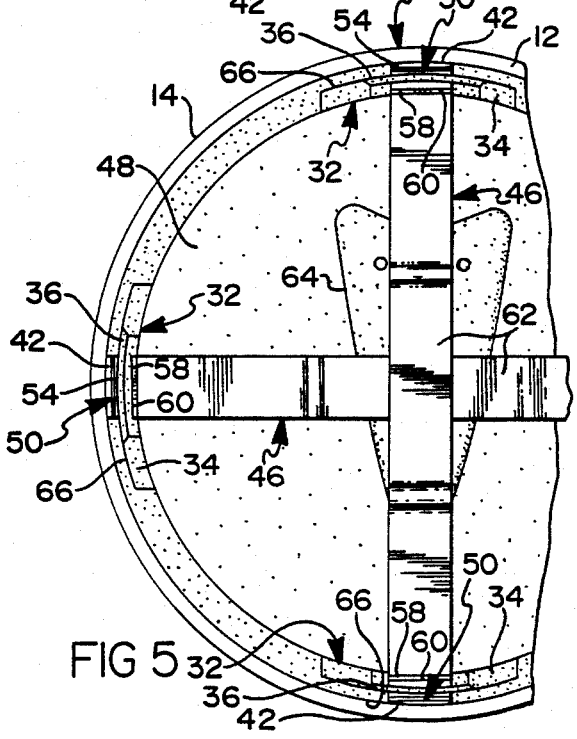
FIG 1
FIG 2
FIG 3
FIG 4
FIG 5

VEHICLE WHEEL COVER

This invention relates generally to vehicle wheel covers and more particularly to a vehicle wheel cover of plastic material having improved retaining means for retaining the cover within an opening of a vehicle wheel.

The wheel cover of this invention generally includes a cover body of plastic material for covering the opening of a vehicle wheel and a plurality of leaf springs which traverse the cover body and have their ends provided with shoulder formations for cooperative engagement with abutment means within the wheel opening to retain the wheel cover in closing relationship to the opening. The leaf springs have their ends anchored to the cover body and are slightly overcenter to thereby provide a spring force resisting movement of the shoulders thereof out of engagement with the abutment means of the wheel opening.

The primary feature of this invention is that it provides a vehicle wheel cover which is retained within an opening of a vehicle wheel through leaf springs which are mounted to the cover and are endwise engageable with the wheel within the wheel opening. Another feature is that the leaf springs are in overcenter relationship to the cover to provide a spring force resisting disengagement of the leaf springs from the wheel.

These and other features of the invention will be readily apparent from the following specification and drawings wherein:

FIG. 1 is a view of a wheel cover according to this invention disassembled from a vehicle wheel.

FIG. 2 is an enlarged view of a portion of FIG. 1.

FIG. 3 is a view taken generally along the plane indicated by line 3—3 of FIG. 4.

FIG. 4 is a view similar to FIG. 1 showing the cover assembled to the wheel and

FIG. 5 is a view taken generally along the plane indicated by line 5—5 of FIG. 1.

Referring now particularly to FIGS. 1 and 4 of the drawings, a wheel cover designated generally 10 is of circular configuration and includes a circular slightly concave cover body 12 of molded plastic material and an outer thin metal cover 14 which decoratively covers the cover body and is hem flanged over the outer periphery thereof. The cover is intended to cover the opening 16 of the center hub portion of a vehicle wheel designated generally 18. This portion of the wheel includes openings 20 for receiving the bolts or lugs 22 of the axle assembly therethrough, with the wheel 18 being held to the axle assembly by conventional lug nuts 24. The opening 16 of the wheel 18 is defined by an axially extending flange 26 which is provided on its radially inner side with at least four radially inwardly extending shoulders or abutments 28 of predetermined circumferential events. Alternatively, the abutments 28 can be provided as part of a continuous rib extending around the radially inner side of the flange 26. The flange 26 is joined to a flange 30 which extends radially outwardly to join the center hub portion of the wheel 18 with the outer rim portion.

The cover body 12 is provided with four axially inwardly extending like tapered integral flanges 32, which are arranged in diametrically opposite pairs and which are circumferentially arcuate so as to complement the circumferentially cylindrical shape of the flange 26. Each flange includes an inner arcuate end edge 34 having a beveled radially outer edge portion 36. Each flange 32 is further provided with a circumferentially elongated opening 38 therethrough and a radially outwardly extending lug 40 having a beveled outer edge 42 and located axially outwardly of each opening 38. Each flange 32 is provided with a triangular depression 44 to each circumferential side of the opening 38 and lug 40.

As shown in FIG. 5, a pair of linear like leaf springs 46 traverse the convex axially inner face 48 of the cover body 12 in cruciform fashion. Each leaf spring has the outer end thereof provided with a return bent shoulder formation 50 which includes a radially extending axially outwardly facing first shoulder portion 52 joined across an arcuate juncture 54 to a radially extending axially inwardly facing shoulder portion 56 which is joined to a terminal flange portion 58 located normal thereto. As shown in FIG. 2, each shoulder formation 50 is received within a respective opening 38 of a flange 32 of the cover body, with the axial and circumferential extends of the shoulder formations 50 being slightly less than those of the openings 38. The terminal fange portions 58 are received within respective slots 60 which extend from the inner edges 34 of flanges 32 to the openings 38. Thus, each leaf spring 46 is endwise anchored to a pair of the diametrically offset flanges 32. As shown in FIGS. 1, 4 and 5, the U-shaped center portions 62 of the springs 46 are offset axially outwardly and cross each other. One center portion 62 seats against an integral axially inward embossment 64 of the cover body 12 while the other center portion 62 seats against that of the one leaf spring.

The axial extent of each leaf spring between its terminal flange portions 58 is greater than the diametrical distance between the bases of the slots 60. Thus, each leaf spring 46 goes slightly overcenter in an axial outward direction between its anchored ends as provided by the engagement of flanges 58 with the bases of slots 60. The engagement of the one center portion 62 with the cover body 12 and the engagement of the other center portion 62 with the one center portion limits the overcenter movement of the leaf springs 46 and provides a spring bias resisting radial movement of the shoulder formations 50 toward each other. Normally the juncture portions 54 extend slightly radially outwardly of the radial outer sides 66 of flanges 32 as shown in FIG. 1. When it is desired to mount the cover 10 in closing relationship to the wheel opening 16, shoulder portions 56 are seated against the axially outer sides of the abutments 28 of flange 26. The cover 10 is then moved axially inwardly relative to the wheel opening to cam the shoulder formations 50 radially inwardly of openings 38 against the spring bias of their respective leaf springs as shoulder portions 56 and junctures 54 movepast abutments 28. Shoulder portions 52 then engage the axially inner sides of abutments 28 to retain the cover 10 to wheel 18 as the shoulder formations 50 move radially outwardly of openings 38. The shoulder formations 50 are slightly radially inward of their FIG. 1 position so that the terminal flange portions 58 are slightly spaced from the bases of the slots 60 as shown in FIGS. 3 and 4. Thus, the leaf springs remain slightly bowed when the cover 10 is mounted to the wheel. During the radial movement of the shoulder formations 50 of a leaf spring relative to openings 38, the portions of the leaf springs radially outwardly of the center portion 62 bow and unbow. The center portions 62 remain seated against each other and the one portion 62 remains seated against the cover body. The engaged position of the shoulder portions 52 of shoulder formations 50 with the axially inner sides of the abutments 28 is controlled by engagement of the tapered edges 42 of lugs 40 with the axially outer sides of the abutments 28. This locates the cover 10 in assembled relationship to the wheel 18 without rattling.

Removal of the cover 10 from wheel 18 is accomplished by pyring the cover 10 out of opening 16 by means of a suitable tool inserted between the peripheral edge of cover 10 and the adjacent part of the wheel.

Thus this invention provides an improved vehicle wheel cover.

The embodiments of the invention in which an exclusive property or privilege is claimed are defined as follows:

1. In combination with a vehicle wheel having axially extending generally annular flange means defining an opening and generally radially inwardly extending abutment means having axially inner and outer sides, a vehicle wheel cover comprising, in combination, a cover body having axially extending radially facing cover flange means locatable in juxtaposed relationship to the wheel flange means and to the abutment means, the cover flange means including diametrically opposite openings and resilient positioning means axially outwardly of each opening, a linear leaf spring traversing the axially inner side of the cover body and including shoulder means adjacent each end thereof and stop means adjacent each shoulder means, each shoulder means of the leaf spring being received in a respective opening of the cover flange means and projecting radially outwardly of the cover flange means through such opening, the spring stop means engaging cooperating stop means on the cover flange means adjacent each opening to set the extent of projection of the spring shoulder means radially outwardly of the cover flange means, the leaf spring between its stop means having a linear extent greater than the diametrical distance between the cover stop means whereby the leaf spring bows and goes overcenter into engagement against the axially inner side of the cover body to provide a spring force resisting radially inward movement of the shoulder means within their respective openings, movement of the cover flange means within the wheel flange means engaging the spring shoulder means with the axially outer sides of the wheel abutment means and forcing the shoulder means inwardly of the openings against the spring force until the shoulder means move axially inwardly of the wheel abutment means and axially engage the axially inner sides thereof to retain the cover against axially outward movement, the resilient positioning means engaging the wheel flange means axially outwardly of the abutment means to resiliently hold the shoulder means in axial engagement with the axially inner sides of the abutment means.

2. The combination recited in claim 1 wherein the cover flange means includes a pair of cover flange portions located in diametrically opposite relationship and wherein the wheel cover includes a second pair of like cover flange portions circumferentially spaced with respect to the first pair of cover flange portions and receiving a second like linear leaf spring.

3. The combination recited in claim 1 wherein the cover body includes an axially inwardly extending embossment engaged by the linear leaf spring as it bows and goes overcenter into engagement with such embossment.

4. The combination recited in claim 1 wherein the cover flange means includes a first pair of cover flange portions located in diametrically opposite relationship to each other and wherein the cover body includes a second pair of diametrically opposite like cover flange portions circumferentially spaced with respect to the first pair and cooperating with a second like linear leaf spring, with the cover body further including an axially inwardly extending embossment on the inner side thereof engaged by the first leaf spring as it bows and goes overcenter and with the second linear leaf spring engaging the first linear leaf spring as the second linear leaf spring bows and goes overcenter.

5. In combination with a vehicle wheel having axially extending generally annular flange means defining an opening and generally radially inwardly extending abutment means having axially inner and outer sides, a vehicle wheel cover comprising, in combination, a cover body having axially extending radially facing cover flange means locatable in juxtaposed relationship to the wheel flange means and to the abutment means, the cover flange means including diametrically opposite openings and radially extending axially flexible positioning means axially outwardly of each opening, a linear leaf spring traversing the axially inner side of the cover body and including shoulder means adjacent each end thereof and stop means adjacent each shoulder means, each shoulder means of the leaf spring being received in a respective opening of the cover flange means and projecting radially outwardly of the cover flange means through such opening, the spring stop means engaging cooperating stop means on the cover flange means adjacent each opening to set the extent of projection of the spring shoulder means radially outwardly of the cover flange means, the leaf spring between its stop means having a linear extent greater than the diametrical distance between the cover stop means whereby the leaf spring bows and goes overcenter against the axially inner side of the cover body to provide a spring force resisting radially inward movement of the shoulder means within their respective openings, movement of the cover flange means within the wheel flange means engaging the spring shoulder means with the axially outer sides of the wheel abutment means and forcing the shoulder means inwardly of the openings against the spring force until the shoulder means move axially inwardly of the wheel abutment means and axially engage the axially inner sides thereof to retain the cover against axially outward movement, the positioning means flexing axially outwardly upon engagement with the wheel flange means axially outwardly of the abutment means to resiliently hold the shoulder means in axial engagement with the axially inner sides of the abutment means.

6. In combination with a vehicle wheel having axially extending generally annular flange means defining an opening and generally radially inwardly extending abutment means having axially inner and outer sides, a vehicle wheel cover comprising, in combination, a cover body having axially extending radially facing cover flange means locatable in juxtaposed relationship to the wheel flange means and to the abutment means, the cover flange means including diametrically opposite openings and resilient positioning means axially outwardly of each opening, a linear leaf spring traversing the axially inner side of the cover body and including shoulder means adjacent each end thereof and axially extending terminal flange means adjacent each shoulder means, each shoulder means of the leaf spring being received in a respective opening of the cover flange means and projecting radially outwardly of the cover flange means through such opening, the spring terminal means engaging the radially inner side of the cover flange means adjacent each opening to set the extent of projection of the spring shoulder means radially outwardly of the cover flange means, the leaf spring between its stop means having a linear extent greater than the diametrical distance between the cover stop means whereby the leaf spring bows and goes overcenter against the axially inner side of the cover body to provide a spring force resisting radially inward movement of the shoulder means within their respective openings, movement of the cover flange means within the wheel flange means engaging the spring shoulder means with the axially outer sides of the wheel abutment means and forcing the shoulder means inwardly of the openings against the spring force until the shoulder means move axially inwardly of the wheel abutment means and axially engage the axially inner sides hereof to retain the cover against axially outward movement, the resilient positioning means engaging the wheel flange means axially outwardly of the abutment means to resiliently hold the shoulder means in axial engagement with the axially inner sides of the abutment means.

7. The combination recited in claim 6 wherein the cover flange means includes a slot on the axially inner side thereof adjacent each opening and receiving a respective terminal flange means of the linear leaf spring.

8. In combination with a vehicle wheel having axially extending generally annular flange means defining an opening and generally radially inwardly extending abutment means having axially inner and outer sides, a vehicle wheel cover comprising, in combination, a cover body of plastic material having integral axially extending radially facing cover flange means locatable in juxtaposed relationshp to the wheel flange means and to the abutment means, the cover flange means including diametrically opposite openings and an integral axially flexible positioning means extending radially outwardly of the cover flange means axially outwardly of each opening, a linear leaf spring traversing the axially inner side of the cover body and including return bent portions providing retention shoulder means adjacent each end thereof and terminal flange means at each end thereof, each shoulder means of the leaf spring being received in a respective opening of the cover flange means and projecting radially outwardly of the cover flange means through such opening, the terminal flange means of the spring engaging the radially inner side of the cover flange means axially inwardly of each opening to set the extent of projection of the spring shoulder means radially outwardly of the cover flange means, the leaf spring between its stop means having a linear extent greater than the diametrical distance between the cover stop means whereby the leaf spring bows and goes overcenter against the axially inner side of the cover body to provide a spring force resisting radially inward movement of the shoulder means within their respective openings, movement of the cover flange means within the wheel flange means engaging the spring shoulder means with the axially outer sides of the wheel abutment means and forcing the shoulder means inwardly of the openings against the spring force until the shoulder means move axially inwardly of the wheel abutment means and axially engage the axially inner sides thereof to retain the cover against axially outward movement, the resilient positioning means flexing axially outwardly and engaging the wheel flange means axially outwardly of the abutment means to resiliently hold the shoulder means in axial engagement with the axially inner sides of the abutment means.

* * * * *